(12) United States Patent  
Suzuki

(10) Patent No.: US 6,801,282 B2  
(45) Date of Patent: Oct. 5, 2004

(54) REFLECTION LCD DEVICE HAVING AN IMPROVED IMAGE QUALITY

(75) Inventor: Teruaki Suzuki, Tokyo (JP)

(73) Assignees: NEC Corporation, Tokyo (JP); NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/207,764

(22) Filed: Jul. 31, 2002

(65) Prior Publication Data

US 2003/0025860 A1 Feb. 6, 2003

(30) Foreign Application Priority Data

Aug. 6, 2001 (JP) ........................................ 2001-237487

(51) Int. Cl.[7] .............................................. G02F 1/1335
(52) U.S. Cl. ........................ 349/119; 349/113; 349/117
(58) Field of Search ......................... 349/113, 117–121

(56) References Cited

U.S. PATENT DOCUMENTS 6,429,920 B1 * 8/2002 Dohi ........................... 349/119
6,552,767 B1 * 4/2003 Kaneko ....................... 349/119
6,580,484 B2 * 6/2003 Okamoto et al. ............ 349/119
6,600,536 B1 * 7/2003 Kuwabara et al. .......... 349/117

FOREIGN PATENT DOCUMENTS

JP            3095005            8/2000

* cited by examiner

Primary Examiner—Robert H. Kim
Assistant Examiner—Michael H Caley
(74) Attorney, Agent, or Firm—Young & Thompson

(57) ABSTRACT

A reflection LCD device has, on a front panel, a first phase shifter having a retardation of 145 to 180 nm which is a sum of ¼ of the central wavelength, 550 nm, of the visible wavelength range and an additional retardation, and a second phase shifter having a retardation of 250 to 300 nm which corresponds to ½ of the central wavelength. The optical axis of the first phase shifter is arranged so that the additional retardation of the first phase shifter and the residual retardation of the LC layer after application of a voltage cancel each other.

4 Claims, 5 Drawing Sheets

REFLECTION LCD DEVICE HAVING AN IMPROVED IMAGE QUALITY

BACKGROUND OF THE INVENTION (a) Field of the Invention

The present invention relates to a reflection type liquid crystal display device (reflection LCD device) having an improved image quality and, more particularly, a reflection LCD device which cancels coloring defects occurring depending on the observing azimuth and due to a higher visual angle.

(b) Description of the Related Art

The reflection LCD device has no backlight on the rear side of the LCD panel and is widely used in a portable device driven by a battery, such as a cellular phone, due to its advantage of lower power dissipation. Most of the up-to-date reflection LCD devices operate in a twisted nematic mode (TN-mode) among a variety of operating modes used heretofore.

A variety of types for the TN-mode LCD devices have been developed and used. Examples of such TN-mode LCD devices include one having a pair of polarizing plates provided on a pair of LCD panels opposing each other, another called normally-black LCD device which includes a reflection electrode in addition to the pair of polarizing plates, and another called normally-white LCD device which includes a reflection electrode and a polarizing plate.

In general, normally-white reflection LCD device is superior to the normally-black reflection LCD device because the dependency of the reflectivity upon the cell gap and the wavelength is lower during displaying a dark state in the normally-white reflection LCD device.

The present inventor disclosed a normally-white reflection LCD device in JP Patent No. 3095005 (JP-A-2000-171788). FIG. 1 shows the layer structure of the conventional reflection LCD device disclosed in the publication, which includes a front panel 10 and a rear panel 20 opposing each other to sandwich therebetween a LC layer 30.

The front panel 10 includes a front substrate 11; a transparent electrode 12 and an orientation film 13 consecutively formed on the rear surface of the front substrate 11 which opposes the LC layer 30; and a stacked $\lambda/4$ (¼-wavelength) plate 14 and a polarizing plate 16 consecutively formed on the front surface of the front substrate 10. The stacked $\lambda/4$ plate 14 includes a $\lambda/4$ phase shifter (phase shifter film) 14A and a $\lambda/2$ phase shifter 14B.

The rear panel 20 includes a rear substrate 21, and a reflection electrode 22 and an orientation film 23 consecutively formed on the front surface of the rear substrate 21, which opposes the LCD layer 30.

The stacked $\lambda/4$ plate 14 is a birefringent plate having a thickness determined to provide a pair of light components of a linearly polarized light with an optical path difference (retardation) of ¼ of the wavelength therebetween, the pair of light components oscillating in orthogonal directions. In general, a birefringent plate for use in a LCD device is implemented by a phase shifter made of a drawn film formed by drawing a high molecule polymer etc.

The $\lambda/4$ plate 14 transforms the linearly polarized light into a circularly polarized light of clockwise rotation or counter-clockwise rotation. This allows the reflection LCD device to assume a bright state upon application of no-voltage and assume a dark state upon application of a voltage.

The reflection LCD device 100 is configured so that the angle $\alpha$ of the polarization absorption axis of the polarizing plate 15 resides between 5 and 35 degrees, the angle $\beta$ of the optical axis of the $\lambda/2$ phase shifter 14B resides between −15 and 15 degrees, and the angle $\gamma$ of the optical axis of the $\lambda/4$ phase shifter 14A resides between −75 and −45 degrees. The angles recited herein are measured from the direction of the orientation of the front panel as a reference direction, with the rotational direction (twist direction) within the LC layer 30 as viewed from the front panel 10 to the rear panel 20 being positive.

By the configuration as recited above, the reflection LCD device 100 cancels altogether the change of the retardation which occurs depending on the visual angle of the LC layer and the change of the retardation which occurs depending on the visual angle of the phase shifters. Thus, the coloring on the display panel which occurs depending on the change of the observing azimuth can be cancelled, wherein the chroma on the display screen upon application of no-voltage is reduced down to below 20 in the color specification test for all the observing azimuths under a polar angle within ±60 degrees.

More specifically, the reflection LCD device solves the problems in that a yellowish coloring phenomenon which occurs depending on the observing azimuth causes displeasure to the user, and in that the coloring of the display which occurs at a higher visual angle causes displeasure to the user.

As described heretofore, the present inventor solved the problems of coloring defects on the display screen which occur depending on the observing azimuth and due to a higher visual angle in the reflection LCD device.

In a current cellular phone, a reflection LCD device mounted thereon for displaying a variety of functions is requested to have excellent image quality such as a higher contrast for assuring the user to easily read smaller characters in the display of the functions on the screen. In addition, the cellular phone is ever requested to have lower power dissipation and operate with a lower battery voltage for achieving a longer time service.

In the conventional reflection LCD device, although the coloring defects in the bright state caused depending on the observing azimuth and by a higher visual angle have been solved to some degree, there still remains another problem in that a lower driving voltage degrades the display contrast to lower the image quality of the reflection LCD device.

Although a specific technique, if employed, can solve the problem that the lower driving voltage degrades the display contrast in the conventional reflection LCD device, it raises the other problems that the yellowish coloring defect occurs depending on the observing azimuth and that an undesirable coloring defect occurs at a higher visual angle, both providing displeasure to the user.

SUMMARY OF THE INVENTION

In view of the above problems in the conventional reflection LCD devices, it is an object of the present invention to provide a reflection LCD device which is capable of solving the problems of the coloring defects occurring depending on the observing azimuth and at a higher visual angle, and also solving the problem of the lower driving voltage that degrades the display contrast.

The present invention provides a LCD device including a front panel, a rear panel and a LC layer sandwiched between the front panel and the rear panel, the front panel including: a front substrate having a front surface and a rear surface; a transparent electrode and a front orientation film consecutively formed on the rear surface of the front substrate; and a first phase shifter, a second phase shifter and a polarizing plate consecutively formed on the front surface of the front substrate, the rear panel including a rear substrate having a front surface and a rear surface, and a reflection electrode and a rear orientation film consecutively formed on the front surface of the rear substrate, the first phase shifter providing a retardation of 145 to 180 nm, the second phase shifter providing a retardation of 250 to 300 nm, angles of an optical axis of the first phase shifter, an optical axis of the second phase shifter and a polarization absorption axis of the polarizing plate with respect to a reference direction being −20 to 10 degrees, 40 to 70 degrees and 60 to 90 degrees, respectively, with a twist direction of the LC layer as viewed from the front panel to the rear panel being a positive direction, the reference direction being perpendicular to an orientation of the LC layer at a center of the LC layer between the front panel and the rear panel.

In accordance with the LCD device of the present invention, the first phase shifter has a retardation of 145 to 180 nm which is a sum of ¼ (138 nm) of the central wavelength, or 550 nm, of the visible wavelength range and an additional retardation. The optical axis of the first phase shifter is arranged so that both the additional retardation and the residual retardation of the LC layer after application of a voltage cancel each other, whereby the reflection LCD device has an excellent dark state even at a lower applied voltage.

Thus, the reflection LCD device of the present invention solves the problem of the coloring defects occurring depending on the observing azimuth and due to a higher visual angle, and prevents reduction of the display contrast even at a lower driving voltage.

The above and other objects, features and advantages of the present invention will be more apparent from the following description, referring to the accompanying drawings.

PREFERRED EMBODIMENT OF THE INVENTION

Figure 1:
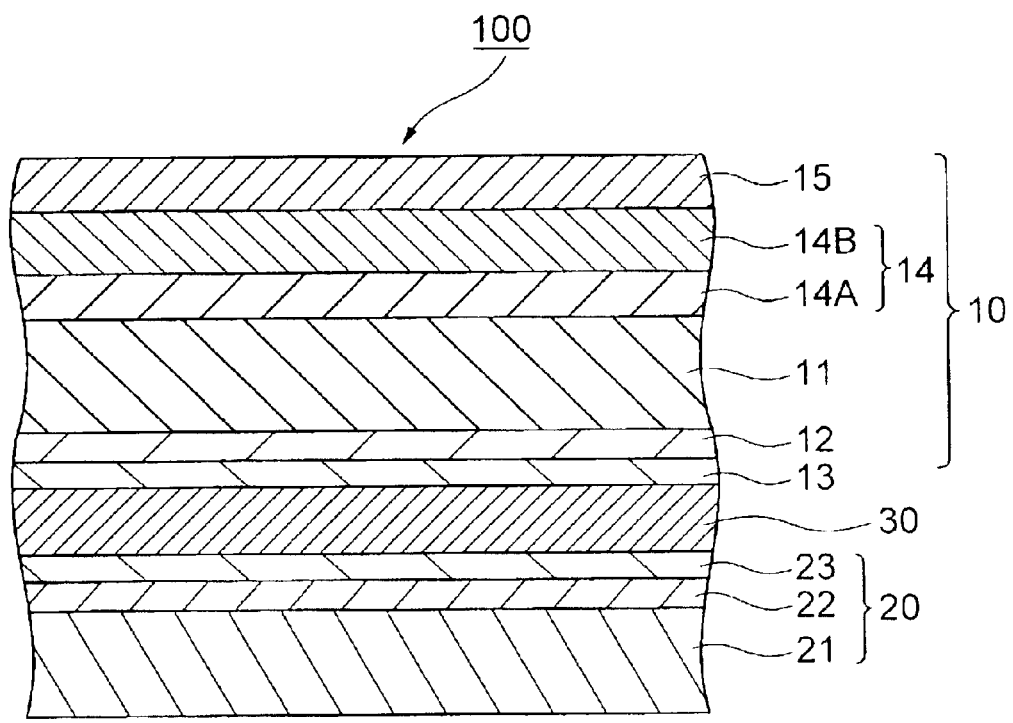
FIG. 1 is a sectional view of a conventional reflection LCD device.

Now, the present invention is more specifically described with reference to accompanying drawings, wherein similar constituent elements are designated by similar reference numerals throughout the drawings.

A reflection LCD device 100A according to an embodiment of the present invention includes a front panel 10A and a rear panel 20 opposing each other to sandwich therebetween a LC layer 30.

The front panel 10A includes a front substrate 11; a transparent electrode 12 and an orientation film 13 consecutively formed on the rear surface of the front substrate 11 which opposes the LC layer 30; and a first phase shifter (film) 16, a second phase shifter (film) 17 and a polarizing plate 15 consecutively bonded onto the front surface of the front substrate 11.

The rear panel 20 includes a rear substrate 21, and a reflection electrode 22 and an orientation film 23 consecutively formed on the front surface of the rear substrate 21, which opposes the LCD layer 30.

The first phase shifter 16 corresponds to the λ/4 phase shifter 14A in the conventional reflection LCD device 100, and has a retardation of 145 to 180 nm, which is slightly increased from a retardation of about 138 nm corresponding to ¼ of the central wavelength 550 nm of the visible wavelength range. The first phase shifter 16 has an optical axis disposed for canceling the residual retardation of the LC layer 30 after application of a voltage by the increased retardation. This arrangement solves the coloring defects in the bright state of the display panel occurring depending on the observing azimuth and due to a higher visual angle. In addition, this arrangement prevents the degradation of the display contrast due to a lower driving voltage, thereby allowing an excellent dark state to be obtained at a lower applied voltage.

In the selection of retardation of the first phase shifter between 145 and 180 nm, it is considered that a smaller retardation below 145 nm degrades the display contrast upon application of a lower voltage, and that a larger retardation above 180 nm precludes the function as a λ/4 phase shifter and cannot remove the coloring defects in the bright state caused depending on the observing azimuth and due to a higher visual angle.

It is more preferable that the retardation of the first phase shifter 16 reside between 150 and 160 nm, which allows the reflection LCD device 100A to have optimum display qualities including the white-color display characteristic upon application of no-voltage, the color appearance in the display, and visual angle characteristic for black color upon application of a voltage.

The first phase shifter 16 of the reflection LCD device 100A may have a relatively larger retardation within the range between 145 and 180 nm to thereby reduce the voltage limit which allows black-color display. However, the above range between 150 nm and 160 nm is optimum in view of overall characteristics including white-color display characteristic and the visual angle characteristic for the black display upon application of a voltage.

The second phase shifter 17 corresponds to the λ/2 phase shifter 14B in the conventional reflection LCD device 100, and has a retardation between 250 and 300 nm, which includes a margin of ±25 nm in view of the fabrication process and the quality control, around a wavelength of 275 nm corresponding to ½ of the central wavelength 550 nm of the visible wavelength range.

In the selection of the retardation of the second phase shifter 17 between 250 and 300 nm, it is considered that a wavelength outside the range 275±25 nm precludes the function as the λ/2 phase shifter and cannot solve the problem of the coloring defects in the bright state caused depending on the observing azimuth and by a higher visual angle.

Figure 3:
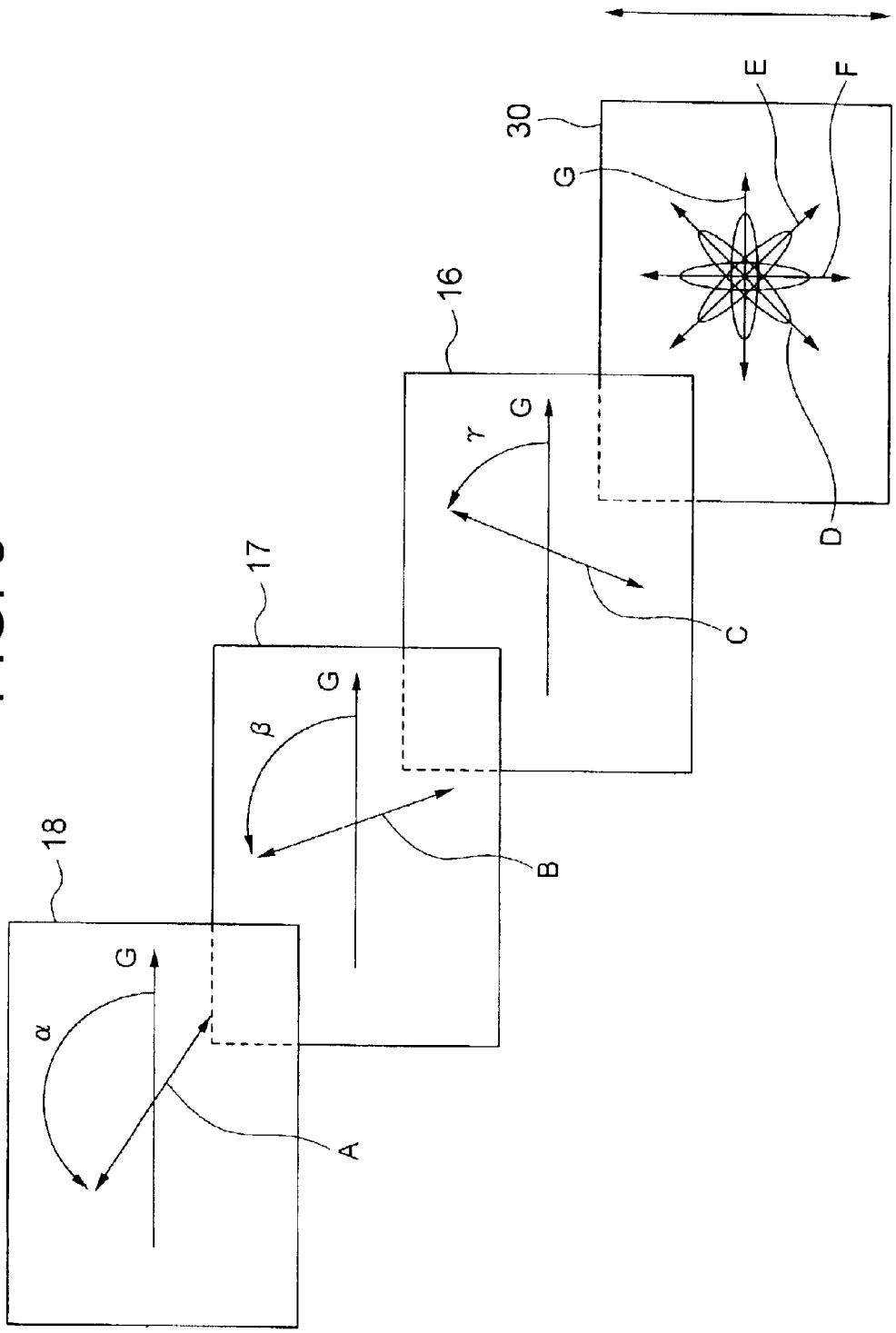
FIG. 3 is explanatory views showing the orientations of the LC layer, and the directions of the polarization absorption axis of the polarizing plate and the optical axes of the phase shifters shown in FIG. 2.

Referring to FIG. 3, there are shown relationships among the orientations of the LC layer 30, the optical axes of the first and second phase shifters 16 and 17 and the polarization absorption axis of the polarizing plate 18.

More specifically, the reflection LCD device 100A has a reference direction "G" which is perpendicular to the orientation "F" of the LC molecules at the center of the LC layer 30 between the front panel 10 and the rear panel 20. The orientation "F" equally divides the angle between the orientation "D" of the LC molecules on the inner surface of the front panel 10 and the orientation "E" of the LC molecules on the inner surface of the rear panel 20. The polarization absorption axis "A" of the polarizing plate 18, the optical axis "B" of the second phase shifter 17 and the optical axis "C" of the first phase shifter 16 are arranged to have angles α, β and γ, respectively, with respect to the reference direction "G". The rotational direction for measuring these angles is determined so that the twist direction of the orientation of the LC layer 30 as viewed from the front panel 10 toward the rear panel 20 (that is, counter-clockwise direction in FIG. 3) is positive.

The arrangement for the directions of the polarization absorption axis and the optical axes is such that the angles α, β and γ are 60 to 90 degrees, 40 to 70 degrees and −20 to 10 degrees, respectively.

By determining the arrangements for the optical axis "C" of the first phase shifter 16, the optical axis "B" of the second phase shifter 17 and the polarization absorption axis "C" of the polarizing plate 18, the change of the retardation of the LC layer 30 and the change of the retardation of the first and second phase shifters 16 and 17 are cancelled by each other to solve the problem of the coloring defects in the bright state caused depending on the observing azimuth and by a higher visual angle.

Although the reference direction "G" in the reflection LCD device 100A for measuring the angles of the polarization absorption axis "A" of the polarizing plate 18 and the optical axes "B" and "C" of the first and second phase shifters 16 and 17 is apparently different from the reference direction used in the conventional reflection LCD device 100, it is substantially the same.

More specifically, the angles α, β and γ are determined so that a linearly polarized light incident on the reflection LCD device 100A has a circular polarization or a linear polarization close to a circular polarization after consecutively passing the polarizing plate 18, the second phase shifter 17 and the first phase shifter 16. The relationship among α, β and γ is determined approximately as follows:

$$\gamma - \alpha = (\beta - \alpha) \pm 45° \quad (1).$$

The angles α, β and γ may be expressed by α=75±15, β=55±15 and γ=−5±15. Substituting the average values for α, β and γ into the equation (1), the left side of the equation assumes γ−α=−5−75=−80 whereas the right side assumes 2(β−α) ±45=2×(55−75)±45=−85 or 5, whereby the equation substantially holds while neglecting the difference between −85 and −80. It is to be noted that the angles α, β and γ respectively include an allowable margin of ±15 degrees.

The LC layer 30 of the reflection LCD device 100A of the resent embodiment is a twisted-nematic-mode (TN-mode) LC layer. By employing a TN-mode LC layer most used in the commercial base, reduction of the costs for the reflection LCD device can be achieved.

The LC layer 30 may preferably have an overall twisted angle of 66 to 74 degrees within the LC layer 30, and the product, which may be referred to as Δn×d hereinafter, of the refractive index anisotropy and the thickness of the LC layer may preferably be 0.21 to 0.31 μm. This range of product Δn×d further reduces the undesirable coloring defect in the display caused by a higher visual angle.

In the specific configuration of the reflection LCD device, the LC layer 30 has an overall twisted angle of about 70 degrees, and Δn×d is about 0.26 μm. It is to be noted that the twisted angle has an allowable margin of ±4 degrees whereby the twisted angle resides between about 66 degrees and about 74 degrees, and Δn×d has an allowable margin of ±0.05 μm whereby Δn×d resides between about 0.21 and about 0.31 μm.

Examples of the materials for the first and second phase shifters 16 and 17 preferably include, but not limited to, polymers of polycarbonate group, polysulfone group, norbornane group and polyvinyl alcohol group, which assure a phase shifter film having a well controlled retardation.

The reflection LCD device may be of segment type, simple matrix type, or an active matrix type, and may be of monochrome type or full-color type having a color filter.

The reflection electrode 22 may preferably have minute depressions and protrusions on the front surface thereof, which provide a moderate dispersion nature and removes an undesirable metallic feeling. The minute depressions and protrusions may cause a problem of local distribution of cell gaps, which can be solved, however, by the configuration wherein the average of the minute depressions and protrusion matches with the value for desired cell gaps.

If the reflection electrode 22 has a flat surface, a dispersion film may be disposed instead between the front substrate 11 and the first phase shifter 16, which configuration also removes the metallic feeling. Other configurations of the reflection LCD device 100A of the embodiment are similar to those of the conventional reflection LCD device 100.

It is to be noted that the orientation of the LC layer 30 in FIG. 3 is determined by the direction "D" of the orientation film 13 of the front panel 10 in the vicinity thereof, and by the direction "E" of the orientation film 23 of the rear panel 20 in the vicinity thereof, whereby the LC molecules in the LC layer 30 have a continuous twist of the orientation between the front panel 10A and the rear panel 20.

The reflection LCD device 100A is of a normally-white type which assumes a bright state upon application of no-voltage, wherein the light incident on the LCD device 100A is converted to a light having a circular polarization or a linear polarization close to a circular polarization after passing consecutively the polarizing plate 18, the second phase shifter 17 and the first phase shifter 16. The converted light is then incident on the LC layer 30.

Upon application of an electric field by the transparent electrode 12, the LC layer 30 changes the orientation thereof, whereby the intensity of the light incident to the LCD device 100A and reflected by the reflecting electrode 22 to reach the user eye is changed depending on the orientation of the LC layer 30 for displaying an image on the display screen.

The reflection LCD device 100A has excellent brightness, higher contrast ratio, and little color variation, and can display an excellent full-color image without causing yellowish coloring in the bright state for a variety of visual angles. In addition, the reflection LCD device 100A prevents degradation of the display contrast caused by a lower driving voltage, and displays an excellent dark state even with a lower applied voltage.

The reflection LCD device 100A of the present embodiment is within the scope of the technical feature of the invention disclosed in the patent publication as described before. By arranging the retardation of the first phase shifter and angles of the polarizing plate and the first and second phase shifters in accordance with the teaching of the publication, the display characteristics with respect to the driving voltage can be significantly improved.

Samples of the embodiment of the present invention as well as comparative examples are manufactured for assuring the advantages of the present invention.

Figure 2:
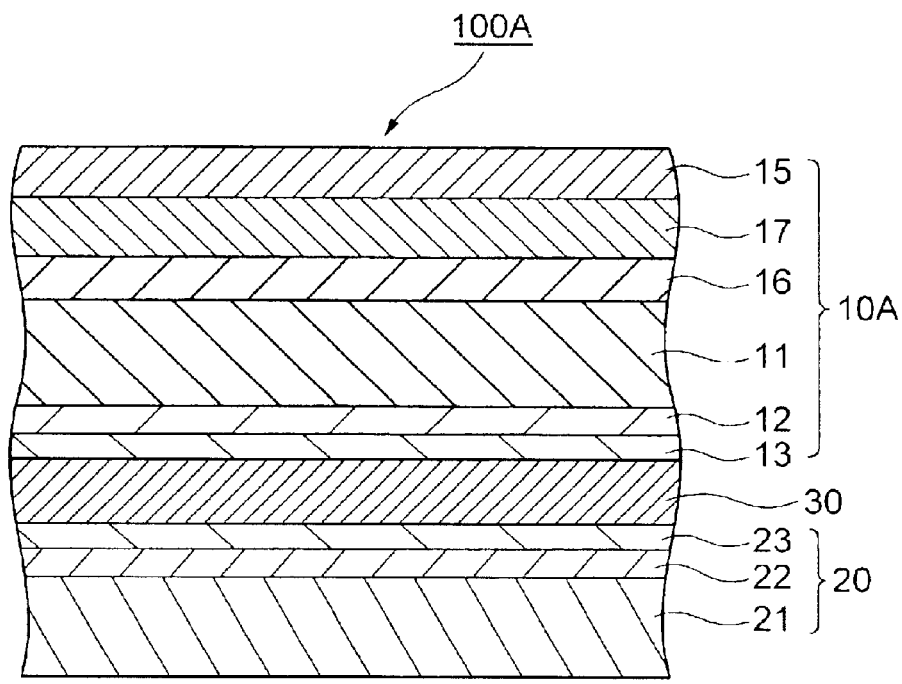
FIG. 2 is a sectional view of a reflection LCD device according to an embodiment of the present invention.

The first sample manufactured had a configuration shown in FIG. 2, wherein the LC layer 30 had a counter-clockwise twist of the orientation as viewed from the front panel 10A toward the rear panel 20. As shown in FIG. 3, the orientation "F" of the LC layer 30 at the center thereof resided in the vertical direction of the reflection LCD device.

The first phase shifter 16 was implemented as a drawn film obtained by drawing a polymer of a polycarbonate group. The first phase shifter 16 provided a retardation of about 156 nm to a monochromatic light having a wavelength of 550 nm, the retardation 156 nm being slightly larger than 138 nm, or ¼ of the wavelength 550 nm of the monochromatic light.

The second phase shifter 17 was implemented as a drawn film obtained by drawing a polymer of a polycarbonate group. The second phase shifter 17 provided a retardation of about 275 nm to the monochromatic light having a wavelength of 550 nm, the retardation 275 nm corresponding to ½ of the wavelength 550 nm of the monochromatic light.

In the first sample, the twist angle of the orientation within the LC layer 30 was set at about 70 degrees with counter-clockwise rotation, Δn×d of the LC layer 30 was about 0.27 μm and the cell gap was about 4.0 μm. The angles α, β and γ were about 77 degrees, about 61 degrees and about zero degrees, respectively.

The voltage-reflectivity characteristic of the first sample was evaluated, wherein the reflectivity upon application of no-voltage was about 40%, and the contrast ratio upon application of 4 volts was 40. It was confirmed that the contrast ratio was satisfactory even with a low driving voltage of 4 volts.

The satisfactory contrast ratio resulted from the fact that the first phase shifter 16 had a retardation of about 156 nm which was slightly larger than ¼ (138 nm) of the central wavelength 550 nm of the visible wavelength range, and that the optical axis of the first phase shifter 16 was arranged so that the additional retardation and the residual retardation of the LC layer 30 after application of a voltage cancelled each other.

Figure 4:
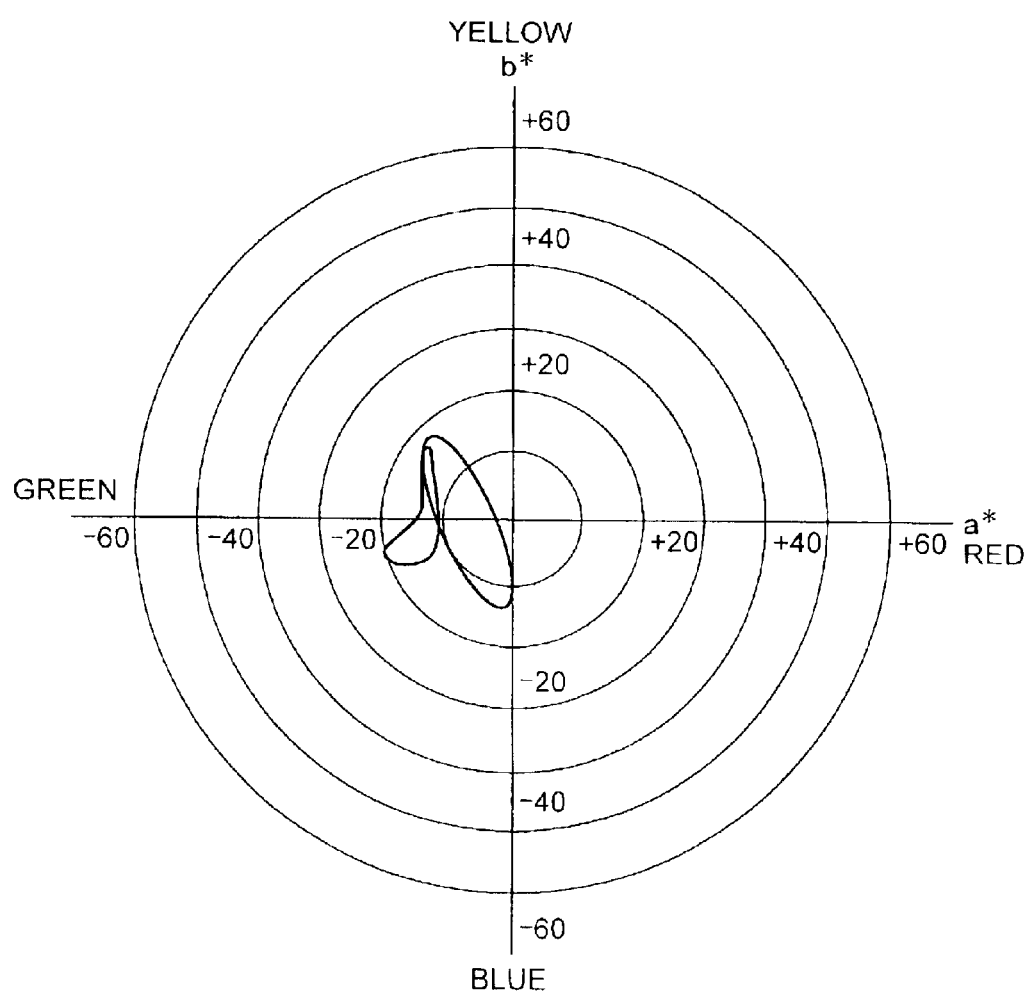
FIG. 4 is a chromaticity locus diagram obtained by observing the display panel of the embodiment upon application of no-voltage while changing the observing azimuth from zero to 360 degrees with a polar angle of 60 degrees.

Referring to FIG. 4, there is shown a chromaticity locus diagram obtained in a color specification test by observing the display panel of the first sample upon application of no-voltage while changing the angle of the observing azimuth from zero to 360 degrees with a constant polar angle of 60 degrees with respect to the LCD panel. In the diagram, chromaticity observed in the test is plotted on a color specification coordinate (L*a*b*), wherein chromaticity (a*) between green and red is plotted on abscissa, whereas chromaticity (b*) between yellow and blue is plotted on ordinate. In this diagram, the distance between each point on the locus and the origin corresponds to chroma (C*).

As understood from FIG. 4, the coloring observed in the test resides within a chroma of about 20, exhibiting substantial cancellation of the coloring defect on the white screen which is caused depending on the change of the observing azimuth.

The second sample of the embodiment used the first and second phase shifters 16 and 17 implemented by drawn films made of a polymer of norbornane group. Arton (trademark) supplied from JSR Corporation was used as the polymer of norbornane group.

The first phase shifter 16 provided a retardation of about 156 nm to a monochromatic light having a wavelength of about 550 nm, the retardation of about 156 nm including ¼ (about 138 nm) of the wavelength 550 nm of the monochromatic light and an additional retardation. The second phase shifter 17 provided a retardation of about 275 nm to the monochromatic light, the retardation of about 275 nm being equal to ½ of the wavelength 550 nm of the monochromatic light.

In the second sample of the reflection LCD device 100A, the twist angle of the LC layer 30 were about 70 degrees with counter-clockwise rotation, Δn×d was about 0.27 μm and the cell gap was about 4.0 μm, similarly to the first sample. The angles α, β and γ were about 73 degrees, about 59 degrees and zero degrees, respectively.

The second sample was subjected to measurement of voltage-reflectivity characteristic. The results were such that the reflectivity was 40% upon application of no-voltage, and the contrast ratio was 40 upon application of 4 volts, exhibiting a satisfactory display contrast at a lower applied voltage.

The second sample was subjected to measurement of the change of chromaticity during application of no-voltage (white) while changing the observing azimuth from zero to 360 degrees with a polar angle of 60 degrees, similarly to the first sample. The results of the measurement were satisfactory, wherein the chroma resided within about 20 for all the observing azimuths.

A first comparative example was manufactured, wherein the first phase shifter 16 had a retardation of about 138 nm, which is smaller than that of the first sample, with the other configurations being similar to those of the first sample.

The material for the first phase shifter 16 was a drawn film made of polycarbonate, which provided a phase shift of ¼ (about 138 nm) of the wavelength 550 nm of the monochromatic light to the monochromic light. The material for the second phase shifter 17 was a drawn film made of polycarbonate, which provided a phase shift of ½ (about 275 nm) of the wavelength 550 nm of the monochromic light to the monochromic light.

The twist angle and Δn×d were substantially same as those of the first sample. More specifically, the twist angle was about 70 degrees (in counter-clockwise rotation), Δn×d was about 0.27 μm and the cell gap was about 4.0 μm. The angles α, β and γ were about 77 degrees, about 61 degrees, and about zero degree, respectively.

The first comparative example was subjected to measurement of voltage-reflectivity characteristic. The results were such that the reflectivity was about 40% upon application of no-voltage, and the contrast ratio was 10 at an applied voltage of 4 volts although the contrast ratio was 40 at an applied voltage of 5 volts. It was confirmed that the first comparative example was inferior to the first sample with respect to the display contrast ratio at a lower applied voltage.

The reason is that the first phase shifter of the first comparative example had no additional retardation added to ¼ (138 nm) of the central wavelength 550 nm of the visible wavelength range, and accordingly the first phase shifter could not cancel the residual retardation of the LC layer 30 after application of a voltage.

A second comparative example was also manufactured in accordance with the teaching of Patent Publication JP-A-2000-122060.

More specifically, the material for the first phase shifter was a drawn film made of a polymer of polycarbonate group, which provided a retardation of about 120 nm which is slightly smaller than ¼ (about 138 nm) of the wavelength 550 nm of the monochromatic light to the monochromatic light. The material for the second phase shifter 17 was a drawn film made of a polymer of polycarbonate group, which provided a phase shift of ½ (about 275 nm) of the wavelength 550 nm of the monochromatic light to the monochromatic light.

In the second comparative example, the design twist angle and Δn×d of the LC layer were similar to those of the first sample.

More specifically, the twist angle was about 70 degrees (in counter-clockwise rotation), Δn×d was about 0.27 μm and the cell gap was about 4.0 μm. The angles α, β and γ were about 90 degrees, about 29 degrees, and about 13 degrees, respectively.

The second comparative example was subjected to measurement of voltage-reflectivity characteristic. The results were such that the reflectivity was about 40% upon application of no-voltage, and the contrast ratio was 40 at an applied voltage of 4 volts. It was confirmed that the second comparative example manufactured in accordance with the teaching of the above publication had a satisfactory display contrast ratio at a lower voltage, similarly to the first sample.

The reason is that the first phase shifter had a retardation of about 120 nm, in this example, which was slightly lower than ¼ (about 138 nm) of the wavelength 550 of the central wavelength of the visible wavelength range, and that the optical axis of the first phase shifter is arranged so that the minus retardation and the residual retardation of the LC layer after application of a voltage compensated for each other.

Figure 5:
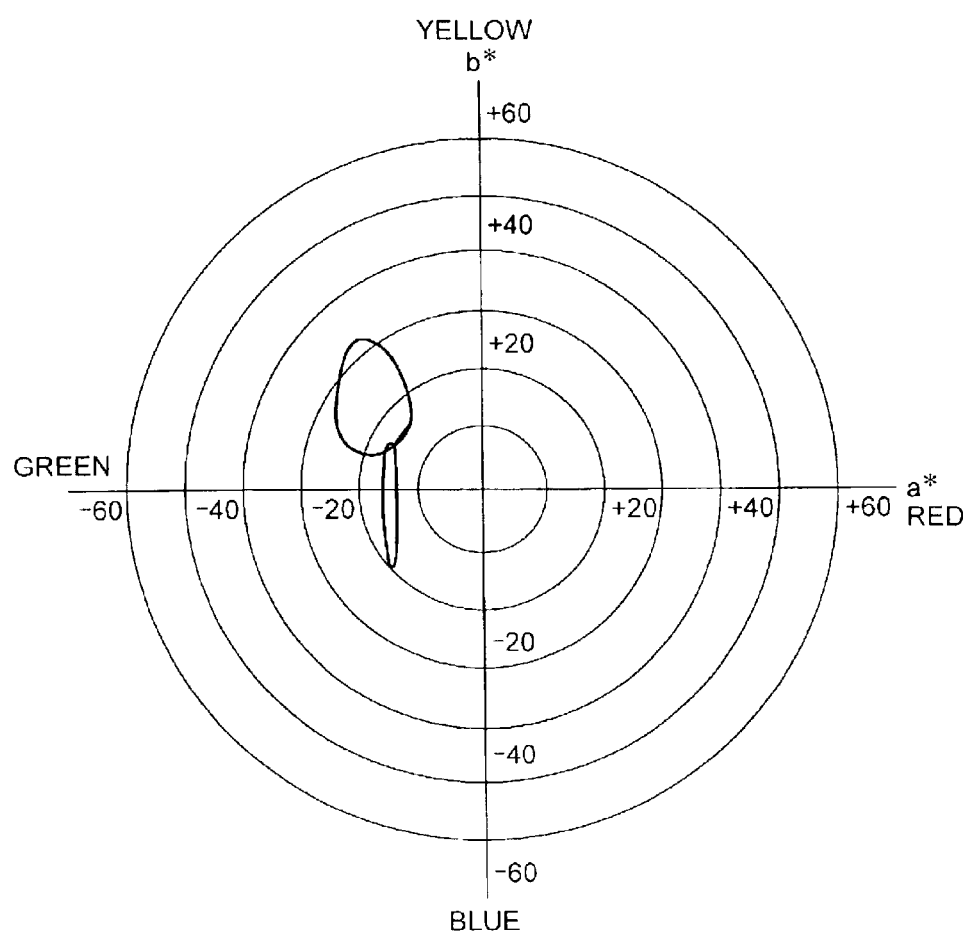
FIG. 5 is a chromaticity locus diagram similar to FIG. 4 obtained by observing the display panel of another conventional reflection LCD device.

The second comparative example was subjected to measurement of chromaticity similarly to the first sample. Referring to FIG. 5, there is shown a chromaticity locus diagram obtained in a color specification test by observing the display panel of the second comparative example upon application of no-voltage while changing the observing azimuth from zero to 360 degrees with a polar angle of 60 degrees with respect to the LCD panel. In the diagram, chromaticity observed in the test is plotted on a color specification coordinate (L*a*b*), wherein chromaticity (a*) between green and red is plotted on abscissa, whereas chromaticity (b*) between yellow and blue is plotted on ordinate. In this diagram, the distance between each point on the locus and the origin corresponds to chroma.

As understood from FIG. 5, the coloring observed in the test changed largely above a chroma of about 20, especially exhibiting a yellowish coloring defect on the white screen, which was noticeably at the observing azimuth shown as the horizontal direction in FIG. 3.

Since the above embodiments are described only for examples, the present invention is not limited to the above embodiments and various modifications or alterations can be easily made therefrom by those skilled in the art without departing from the scope of the present invention.

What is claimed is:

1. A reflection type liquid crystal display device (reflection LCD device) comprising a front panel, a rear panel and a liquid crystal (LC) layer sandwiched between said front panel and said rear panel, said front panel including a front substrate having a front surface and a rear surface, a transparent electrode and a front orientation film consecutively formed on said rear surface of said front substrate, and a first phase shifter, a second phase shifter and a polarizing plate consecutively formed on said front surface of said front substrate, said rear panel including a rear substrate having a front surface and a rear surface, and a reflection electrode and a rear orientation film consecutively formed on said front surface of said rear substrate, said first phase shifter having a retardation of 145 to 180 nm, said second phase shifter having a retardation of 250 to 300 nm, angles of an optical axis of said first phase shifter, an optical axis of said second phase shifter and a polarization absorption axis of said polarizing plate with respect to a reference direction being −20 to 10 degrees, 40 to 70 degrees and 60 to 90 degrees, respectively, with a twist direction of said LC layer as viewed from said front panel to said rear panel being a positive direction, said reference direction being perpendicular to an orientation of said LC layer at a center of said LC layer between said front panel and said rear panel;

wherein said LC layer is a twisted nematic LC layer; and
   wherein said LC layer has a twist angle of 66 to 74 degrees, and wherein a product of a refractive index anisotropy and a thickness of said LC layer is 0.21 to 0.31 μm.

2. The reflection LCD device as defined in claim 1, wherein said retardation of said first phase shifter is 150 to 160 nm.

3. The reflection LCD device as defined in claim 1, wherein said first and second phase shifters are made of a polymer of polycarbonate group, polysulfone group, norbornane group or polyvinyl alcohol group.

4. The reflection LC device as defined in claim 1, wherein said reflection electrode has a plurality of depressions and a plurality of protrusions on a front surface thereof.

* * * * *